Figure 1:
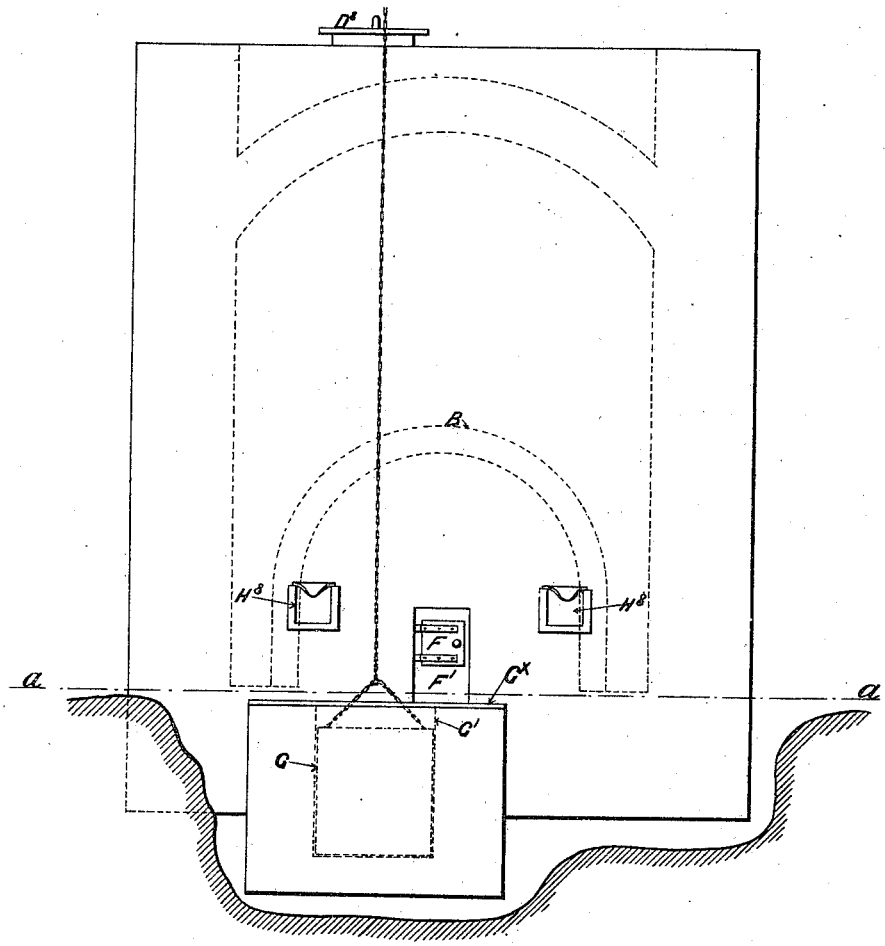

No. 617,254. Patented Jan. 3, 1899.
J. H. MITCHELL, H. G. DOWNTON & W. H. NICHOLLS.
APPARATUS FOR DESTRUCTION OF NIGHT SOIL, &c.
(Application filed Nov. 22, 1897.)

(No Model.) 4 Sheets—Sheet 1.

No. 617,254. Patented Jan. 3, 1899.
J. H. MITCHELL, H. G. DOWNTON & W. H. NICHOLLS.
APPARATUS FOR DESTRUCTION OF NIGHT SOIL, &c.
(Application filed Nov. 22, 1897.)
(No Model.) 4 Sheets—Sheet 3.

No. 617,254. Patented Jan. 3, 1899.
J. H. MITCHELL, H. G. DOWNTON & W. H. NICHOLLS.
APPARATUS FOR DESTRUCTION OF NIGHT SOIL, &c.
(Application filed Nov. 22, 1897.)
(No Model.) 4 Sheets—Sheet 4.

UNITED STATES PATENT OFFICE.

JAMES HARVEY MITCHELL, OF PETERSHAM, AND HENRY GEORGE DOWNTON AND WILLIAM HENRY NICHOLLS, OF CORYDON, NEW SOUTH WALES, ASSIGNORS TO SAID DOWNTON AND NICHOLLS.

APPARATUS FOR DESTRUCTION OF NIGHT-SOIL, &c.

SPECIFICATION forming part of Letters Patent No. 617,254, dated January 3, 1899.

Application filed November 22, 1897. Serial No. 659,504. (No model.)

*To all whom it may concern:*

Be it known that we, JAMES HARVEY MITCHELL, gentleman, a citizen of the United States, residing at Petersham, near Sydney, and HENRY GEORGE DOWNTON, brick manufacturer, and WILLIAM HENRY NICHOLLS, accountant, subjects of the Queen of Great Britain, residing at Corydon, near Sydney, in the British Colony of New South Wales, have invented new and useful Improvements in Apparatus for the Destruction of Night-Soil and Noxious Matters, (for which applications for Letters Patent were filed in the British Colonies of New South Wales on the 31st day of August, 1897, and numbered 7,760; in Victoria on the 6th day of September, 1897, and numbered 14,555; in Queensland on the 2d day of September, 1897, and numbered 4,056, and in New Zealand on the 9th day of September, 1897, and numbered 9,884, and according to the law of and in each of the said British Colonies such Letters Patent if and when issued will bear date as of the day of filing, but neither of said applications have been granted,) of which the following is a specification.

This invention relates to the destruction of night-soil, garbage, house refuse, waste products of noxious trades, and other like matters, either dry or wet, and it has been devised in order to produce an economical and efficient apparatus for the purpose.

The purpose of the invention is the complete incineration and roasting of the matter to be destroyed in a closed and sealed oven or retort, so that the solids will be converted into ash or like innoxious material, the liquids thoroughly evaporated, and the vapors and gases collected and utilized in the production of heat in the furnace under the said oven or retort. The improvements in apparatus for the said purpose consist mainly of the peculiar construction of oven or retort and connections and in the particular combinations and arrangements of mechanical parts hereinafter described and specifically claimed.

In order that this invention may be clearly understood, reference will now be made to the drawings herewith, in which—

Figure 2:
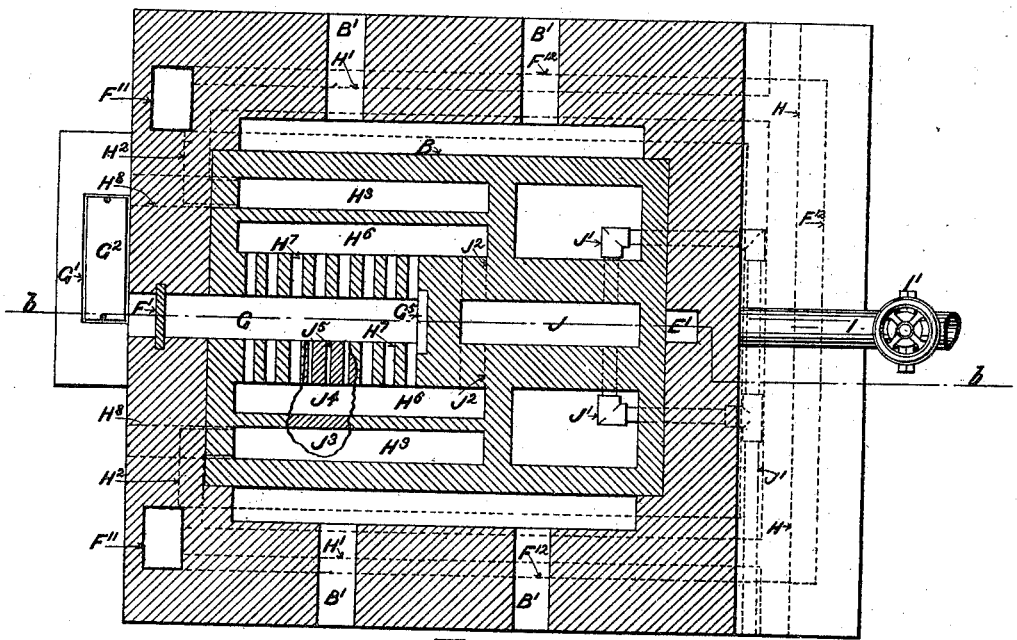
Figure 3:
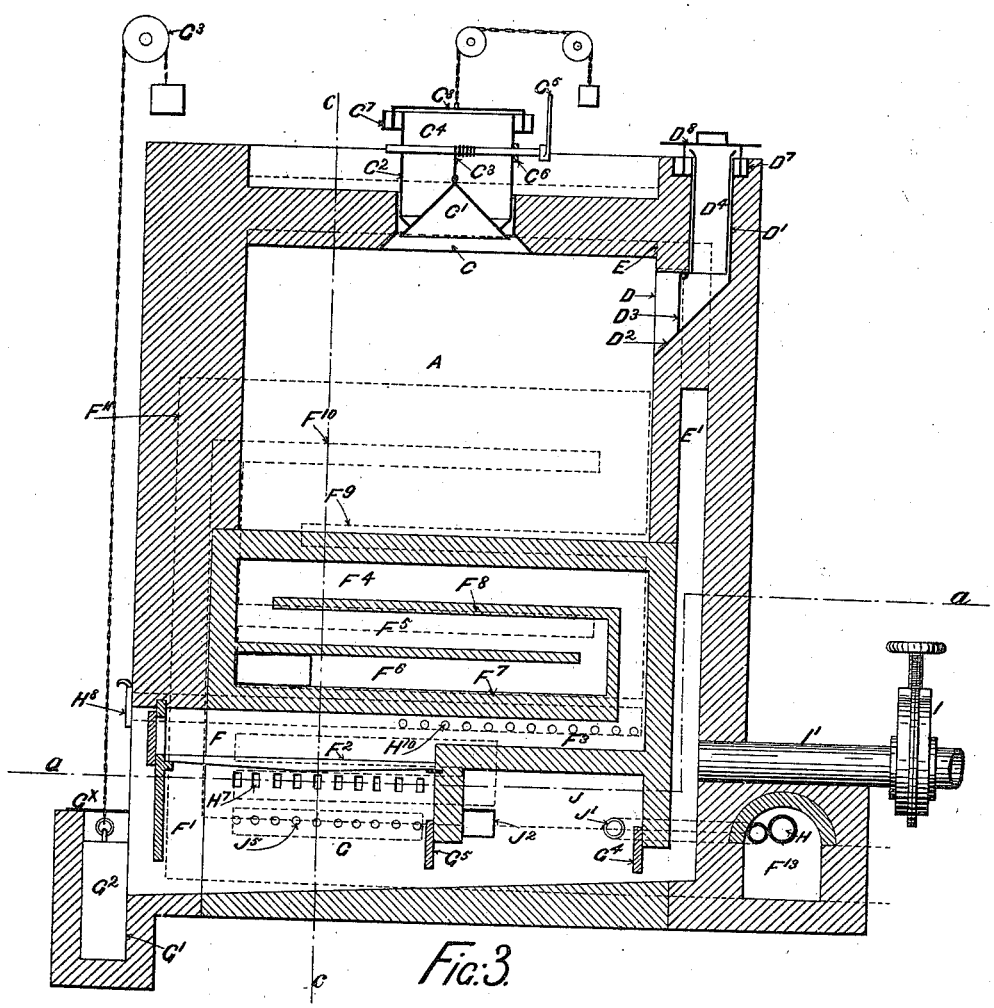
Figure 4:
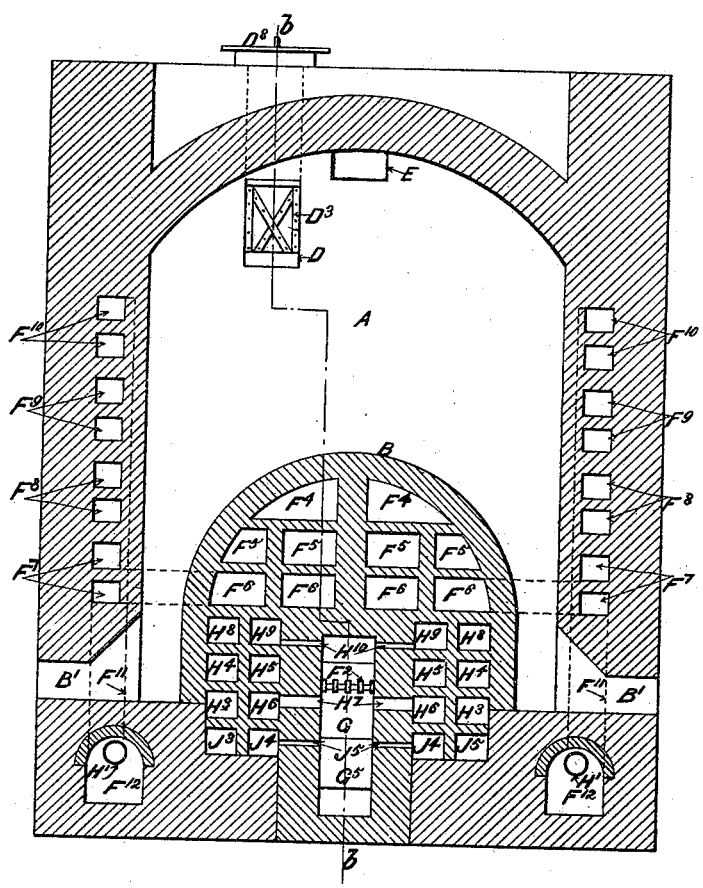

Figure 1 is a front elevation of the oven or retort with furnace and flues and connections. Fig. 2 is a sectional plan on line $a\,a$ in Fig. 1 or in Fig. 3. Fig. 3 is a longitudinal sectional elevation on line $b\,b$ in Fig. 2, and Fig. 4 is a transverse section on line $c\,c$ in Fig. 3.

The oven or retort A is superposed over an arch containing a nest of flues, in the center of which are the furnace and ash-pit. The oven or retort A wholly surrounds the arch B and at the base has openings or ports B' for discharging the ashes or waste when desired, these ports being normally sealed with luted doors. At the top of the oven or retort two feeding-openings C and D are shown, though one of these in most cases would be sufficient in practice. The opening C is closed by a cone C', preferably hollow-bottomed and of metal, which takes up against the orifice of a lining $C^2$, preferably also of metal. This cone C' is suspended by chain $C^3$, which may be wound on axle or spindle $C^4$ (in air-tight bearings through the lining $C^2$) by turning said axle by means of a ratchet-handle $C^5$ or a crank and held in place by a pawl and ratchet $C^6$. On the top of the lining $C^2$ is a surrounding trough $C^7$, which is supplied with water or sand, in which takes the rim of the cover $C^8$ and so forms a seal. The cover $C^8$ is suspended from a pulley and has a counterbalance-weight for ease in handling. The opening D has a lining D', with an inclined bottom $D^2$, and it has a hinged door $D^3$, adapted by its own weight to keep closed upon bottom $D^2$. Within the lining D' is a telescopic pipe $D^4$, adapted to be lifted and hung to the back or bottom of a cart or other discharging conveyance or apparatus and to be lowered and to be closed under the cover $D^8$, which forms a seal, when its rim takes in annular trough $D^7$, filled with sand or water. The oven or retort A has orifice E, leading to flue or downtake E', whose further connections will be hereinafter described.

The furnace F has the ordinary door F" and fire-bars $F^2$, and the gases of combustion pass therefrom by flue $F^3$, split at the back, and return by flues $F^4$ and pass backward and forward by flues $F^5$ and $F^6$, from the latter of which they pass on either side to couplet-flues F⁷, F⁸, F⁹, and F¹⁰ in the side walls of the oven or retort A, passing backward and forward until they reach downtakes F¹¹, which convey them to side flues F¹², in which they pass along to cross-flue F¹³, whence they find their way by other flue (not shown) to a convenient chimney-stack.

The ash-pit G forms part of a water receptacle or tank extending from the bottom of downtake E' to the furnace-front and terminating in a pit G', in which is a piston or weight G², hung over a pulley G³ from a counterbalance. In this water-receptacle are dividing-pieces G⁴ and G⁵, each one forming a seal in the water and dividing the downtake E' from a closed mixing-chamber and this chamber from the ash-pit, while the furnace-front F' also forms a seal and separates the ash-pit G from the outer air. For convenience in working the pit G' has a cover G×, forming a floor for the furnaceman.

Air-pipe H, open at its outer ends, passes from end to end of flue F¹³ and has offsets H', taking along flues F¹² (and thus the air therein will become heated) and connecting by passages H² with flues H³, H⁴, H⁵, and H⁶, in which the air passes backward and forward along the side of the furnace and becomes thoroughly heated before it finds its way through orifices H⁷ into the ash-pit G under the fire-bars, where it commingles with the vapors and gases from the oven or retort (and with other gas, if supplied) before entering furnace F between the fire-bars F². A flue H⁸ is utilized to admit air from front of the oven or retort through a damper and carry it along to return-flue H⁹, having outlets H¹⁰, to above the fire at the back, so as to assist in the combustion of the gases leaving the fire.

The gases and vapors in downtake E' may find their way through pipe I', if valve I be open, into a mixing and storage reservoir, as an ordinary gas-holder, where they may be conserved for afteruse, or where they may be mixed or reinforced, as required, either hot or cold, with other gases to render them suitable for heating or even for illuminating purposes. If the valve I be closed or if there be sufficient back pressure in the holder, the gases and vapors from downtake E' will pass under seal G⁴ into a part of the before-mentioned water-receptacle below the furnace, which part is mixing-chamber J. Into this chamber, at either side, enter gas-pipes J', and from it are ports or flues J², connecting with flues J³ and J⁴ backward and forward at side of ash-pit G, from the latter of which are orifices J⁵, leading to under the fire-bars. The gases and vapors from the oven or retort pass then into chamber J, where their condensable portions are separated out by the water floor or base of said chamber and where the gases may be blended with other suitable gases supplied through pipes J'. The gases, either raw or blended and reinforced in the manner described, pass from the chamber J to the space beneath the fire-bars F², being heated by the way, and flow through between said bars, together with heated air supplied from the orifices H⁷, said mixture of hot air and gases being a material aid to combustion. They are thus thoroughly consumed in the furnace.

Having described the operation of the various parts, there is but little further to be said to make the practical working of this invention understandable. Suffice it that the night-soil and other noxious matters are fed into the oven or retort A through one or other of the openings C and D. The furnace F is charged with fuel (a minimum of which is required) to keep said oven or retort at its greatest possible heat at all times. If desired, when feeding the piston G² may be raised in pit G', so as to lower the level of the water in the bottom chamber, thus opening seals G⁴ and G⁵, (though seal F' being longer still remains closed,) when a draft will be induced from the oven or retort through the downtake, the mixing-chamber, and the flues to the fire, and thus prevent the escape of any foul odors, gases, or vapors. The ashes or like product of the incineration and roasting are allowed to accumulate in the oven or retort to just about the level of the arch B and become a hot base, on or in which all matters are thoroughly reduced by heat. When this hot base requires its top level lowered, some of it is removed through ports or openings B'; but, comparatively speaking, this is not required to be performed very often. The level of this hot base may be ascertained through convenient test-holes, which are adapted to be made air-tight when not required.

Having now particularly described and ascertained the nature of our said invention and in what manner the same is to be performed, we declare that what we claim is—

1. In an apparatus for the incineration and destruction of night-soil and other noxious substances, the combination with a closed retort, or oven, of a furnace, a draw-off flue, or downtake, for gases and vapors, a water chamber or receptacle having communication with the combustion-chamber of the furnace, sealing devices to divide said chamber into separate parts such as a mixing and condensing chamber and an ash chamber or pit, and means for varying the water-level in said water-chamber, substantially as described.

2. In an apparatus for the incineration and destruction of night-soil and other noxious substances, the combination with a suitable furnace and an oven or closed retort of a draw-off flue, or downtake, for gases and vapors, a water chamber or receptacle arranged beneath the furnace, and having communication with the combustion-chamber for the gases which flow through the downtake, sealing devices to divide said water-chamber into a plurality of parts one of which is a mixing and condensing chamber and another an ash chamber or pit arranged beneath the fire-bars, and a piston movable in a pit containing water and communicating with the water-chamber, whereby the level of the water in the latter may be varied, substantially as described.

3. In an apparatus for the incineration and destruction of night-soil and other noxious substances, the combination with a suitable furnace of a closed retort, or oven, of a draw-off flue, or downtake for gases and vapors, a water chamber or receptacle arranged beneath and extending beyond the fire-bars of the furnace, sealing devices to separate said water-chamber into an ash chamber or pit which includes the portion lying beneath the fire-bars and a mixing and condensing chamber which receives the gases and vapors descending the downtake, a piston movable in a water-pit which communicates with the water-chamber, and means for operating said piston to vary the water-level in said water-chamber, passages being provided whereby the gases and vapors flowing from the mixing and condensing chamber may pass to the furnace, substantially as described.

4. In an apparatus for the destruction of night-soil and other noxious substances, the combination with a suitable furnace and a closed retort or oven, of a water chamber or receptacle extending under said furnace, sealing devices dividing said water-chamber into an ash chamber or pit which lies beneath the fire-bars of the furnace and a mixing and condensing chamber, a downtake for gases and vapors communicating at its lower end with the said mixing-chamber, a water-pit communicating with the water-chamber, a piston movable in the pit to vary the water-level, a series of ports or passages being provided in the retort and furnace whereby atmospheric air and the gases produced by combustion may be heated and discharged into the furnace, substantially as described.

5. In an apparatus for destroying night-soil and other noxious substances, the combination with a furnace of a retort, or oven, inclosing said furnace, a downtake in said retort for the gases and vapors, a water-chamber comprising a separate mixing and condensing chamber into which the downtake discharges, means for raising and lowering the water-level in said chamber and gas-pipes entering the mixing and condensing chamber, the furnace and retort being provided with ports or passages to be traversed by the gases after leaving said chamber, and by air, whereby said air and gases are heated and then delivered to the furnace to sustain and insure complete combustion, substantially as described.

6. In an apparatus for the destruction of night-soil and other noxious material, the combination with a furnace structure having a series of passages for air and for the gases produced by combustion, said passages entering the combustion-chamber above and beneath the fire-bars, of a retort, or oven, inclosing said furnace and provided with passages communicating with those in the furnace, a water-chamber divided into an ash chamber or pit lying beneath the fire-bars and a mixing and condensing chamber, the latter having communication through said passages with the combustion-chamber of the furnace, a downtake in the wall of the retort to deliver gases and vapors to the mixing and condensing chamber, a water-pit communicating with the water-chamber and a movable piston in said pit to vary the level of the water in said water-chamber, substantially as described.

Dated this 5th day of October, 1897.

JAMES HARVEY MITCHELL.
HENRY GEORGE DOWNTON.
WILLIAM HENRY NICHOLLS.

Witnesses:
 FRED WALSH,
 PERCY NEWELL.